(12) United States Patent
Xu et al.

(10) Patent No.: US 11,483,659 B2
(45) Date of Patent: Oct. 25, 2022

(54) SPEAKER DEVICE AND MOBILE TERMINAL

(71) Applicant: AAC Technologies Pte. Ltd., Singapore (SG)

(72) Inventors: Shasha Xu, Shenzhen (CN); Yao Hui, Shenzhen (CN); Zhe Zhang, Shenzhen (CN); Dijiang Tong, Shenzhen (CN); Jun Wu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 294 days.

(21) Appl. No.: 16/996,913

(22) Filed: Aug. 19, 2020

(65) Prior Publication Data

US 2021/0112342 A1 Apr. 15, 2021

(30) Foreign Application Priority Data

Oct. 15, 2019 (CN) .......................... 201910979666.9

(51) Int. Cl.

| | |
|---|---|
| *H04R 9/02* | (2006.01) |
| *H04M 1/02* | (2006.01) |
| *H04R 1/02* | (2006.01) |
| *H04R 1/34* | (2006.01) |
| *H04R 7/12* | (2006.01) |
| *H04R 9/06* | (2006.01) |
| *H04R 29/00* | (2006.01) |

(52) U.S. Cl.
CPC ............ *H04R 9/022* (2013.01); *H04M 1/026* (2013.01); *H04R 1/025* (2013.01); *H04R 1/345* (2013.01); *H04R 7/12* (2013.01); *H04R 9/06* (2013.01); *H04R 29/001* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 10,841,706 B2 * | 11/2020 | Davis | ...................... | H04R 9/022 |
| 2013/0312429 A1 * | 11/2013 | Greuet | ...................... | H05K 7/20 62/6 |
| 2015/0018053 A1 * | 1/2015 | Chou | ...................... | G06F 1/203 455/575.1 |
| 2017/0205858 A1 * | 7/2017 | Wong | ................... | H04R 1/2834 |
| 2018/0167738 A1 * | 6/2018 | Liu | ...................... | H04R 31/006 |

* cited by examiner

*Primary Examiner* — Antim G Shah
(74) *Attorney, Agent, or Firm* — W&G Law Group (57) ABSTRACT

The present invention discloses a speaker device. The speaker device comprises a speaker box, a heat source, and a heat conducting member; the speaker box comprises a housing, a speaker, a sound-guiding channel, and a heat conducting plate; the speaker includes a diaphragm, the first receiving space is divided into a front sounding chamber and a back chamber, and the sound-guiding channel communicates the front sounding chamber with the outside and forms a front chamber together with the front sounding chamber; the housing having an opening penetrating therethrough, the opening communicates with the front chamber, and the heat conducting plate covers on the opening, an adjusting hole penetrates through the housing and communicates with the back chamber; an valve covers on the adjusting hole and a controller for outputting a control signal to control the valve to open or to close.

18 Claims, 6 Drawing Sheets

SPEAKER DEVICE AND MOBILE TERMINAL

FIELD OF THE PRESENT INVENTION

The present invention relates to acoustoelectric field, and more particularly to a speaker device and a mobile terminal.

DESCRIPTION OF RELATED ART

With the advent of the mobile internet era, the number of smart mobile devices is continuously increasing. Among numerous mobile devices, mobile phones are undoubtedly the most common and openingable mobile terminal devices. A speaker device for playing sound is widely applied to smart mobile devices, such as mobile phone.

In the related art, a mobile terminal includes a shell, a screen covered on the shell to form a receiving space, a heat source accommodated in the receiving space, and a heat discharging copper tube at least partially attached on the heat source. The heat discharging copper tube is received in the mobile terminal, and is generally attached to a middle frame of the shell, therefore the heat dissipation of the heat source is achieved through the middle frame.

However, in the related art, the heat is easily accumulated in the mobile terminal, and the heat cannot be radiated to the outside of the mobile terminal in time, so that the heat is easily accumulated inside the mobile terminal, resulting in poor heat dissipation, thereby affecting its performance.

Therefore, it is desired to provide a new speaker device and mobile terminal to solve the above-mentioned problems.

SUMMARY OF THE PRESENT INVENTION

The purpose of the present invention is to provide a speaker device and a mobile terminal with good heat dissipation effect.

In one aspect, a speaker device includes a speaker box for producing sound, a heat source spaced apart from the speaker box, a heat conducting member connecting the speaker box and the source, a valve and a controller. The speaker box includes a housing having a receiving space, a speaker received in the housing, a sound-guiding channel formed in the housing, and a heat conducting plate. The speaker includes a diaphragm vibrating to generate sound, the first receiving space is divided into a front sounding chamber and a back chamber by the diaphragm, and the sound-guiding channel communicates the front sounding chamber with the outside to form a front chamber together. The housing is provided with an opening and an adjusting hole, the opening communicates with the front chamber, and the adjusting hole communicates with the back chamber. The heat conducting plate covers on the opening, and the valve covers on the adjusting hole. One end of the heat conducting member is fixed to one side of the heat conducting plate away from the diaphragm, and the other end is fixed to the heat source. The controller is configured for detecting a first temperature of the heat source and a second temperature of the speaker box, and a control signal is output after calculating the temperature according to a preset rule to control the valve to open or to close.

In some embodiment, the preset rule is: when both the first temperature and the second temperature are greater than a preset high temperature threshold, the controller outputs a first control signal to control the valve to open; when both the first temperature and the second temperature are less than a preset low temperature threshold, the controller outputs a second control signal to control the valve to close.

In some embodiment, the valve and the housing are configured as a hinged or sliding connection.

Preferably, the housing includes an upper cover and a lower cover covered on the upper cover to form the first receiving space. The opening and the adjusting hole are respectively penetrating through the upper cover, the sound-guiding channel is formed in the upper cover. The front sounding chamber is formed by the heat conducting plate, the diaphragm, and the upper cover; and the back chamber is formed by the lower cover, the upper cover, and the diaphragm.

Preferably, an orthographic projection of the heat conducting plate along a vibrating direction projected on the diaphragm at least partially falls on the diaphragm.

Preferably, the heat conducting member includes a heat conducting body and an expanding portion extending from an end of the heat conducting body close to the speaker box. A width of the expanding portion is greater than a width of the heat conducting body, and the expanding portion is completely attached to the heat conducting plate.

Preferably, the heat conducting plate is a steel sheet or a copper sheet.

Preferably, the heat conducting member is a hollow heat tube.

Preferably, the heat source is any one of a processor and a battery.

In another aspect, a mobile terminal includes a shell and a screen covered on the shell to form a second receiving space. The mobile terminal further includes the speaker device as above-mentioned, the speaker device is received in the second receiving space, the shell is provided with a sounding opening penetrating therethrough, and the sounding opening communicates with the front sound chamber through the sound guiding channel, thus to radiate the heat in the front sounding chamber conducted by the heat source to the outside of the shell.

Compared with the related art, in the present invention, the heat conducting member is disposed between the speaker box and the heat source, one end of the heat conducting member is fixed to the heat conducting plate of the speaker box, and the other end is fixed to the heat source. The speaker box is provided with the adjusting hole penetrating the housing and communicating with the back chamber, the valve covered on the adjusting hole and the controller. The heat is transferred to the heat conducting plate by the heat source through the heat conducting member, and the heat enters in the front sounding chamber. The diaphragm vibrates to push the air in the front sounding chamber to flow to the outside through the sound-guiding channel, thereby achieving the heat dissipation of the heat source. The controller is configured for detecting the first temperature of the heat source and the second temperature of the speaker box, and the control signal is generated after calculating the temperature according the preset rule, so as to control the valve to open or to close. When the valve is open, the speaker box is switched from a closed chamber mode to an open chamber mode. The back chamber of the speaker box is communicated with the outside, and the back chamber is equivalent to include a part of the external chamber, which can be operated with lower power, thereby reducing the temperature of the speaker box, so the heat conducting member can conduct heat effectively. Therefore, the speaker device has a better heat dissipation effect, and its performance is effectively improved. Besides, when the speaker box is switched from the closed chamber mode to the open chamber mode, the sound state does not change significantly, so the acoustic experience under the heat dissipation mode is improved.

BRIEF DESCRIPTION OF THE DRAWINGS

The embodiment of the present invention will be more clearly understood from the following drawings. It is obvious that the following described drawings are merely some embodiments of the invention. For the person skilled in the art, he can achieve the other drawings from the drawings without any creative work.

DETAILED DESCRIPTION OF THE EXEMPLARY EMBODIMENT

The technical solution in the embodiments of the invention will be clearly and completely described by combining with the drawings in the embodiments of the invention. Apparently, the described embodiments are merely parts of the embodiments of the invention, but not all of the embodiments. Based on these embodiments, all the other embodiments that the person skilled in the art can achieve without making creative work, are belong to the scope of protection of the invention.

Figure 1:
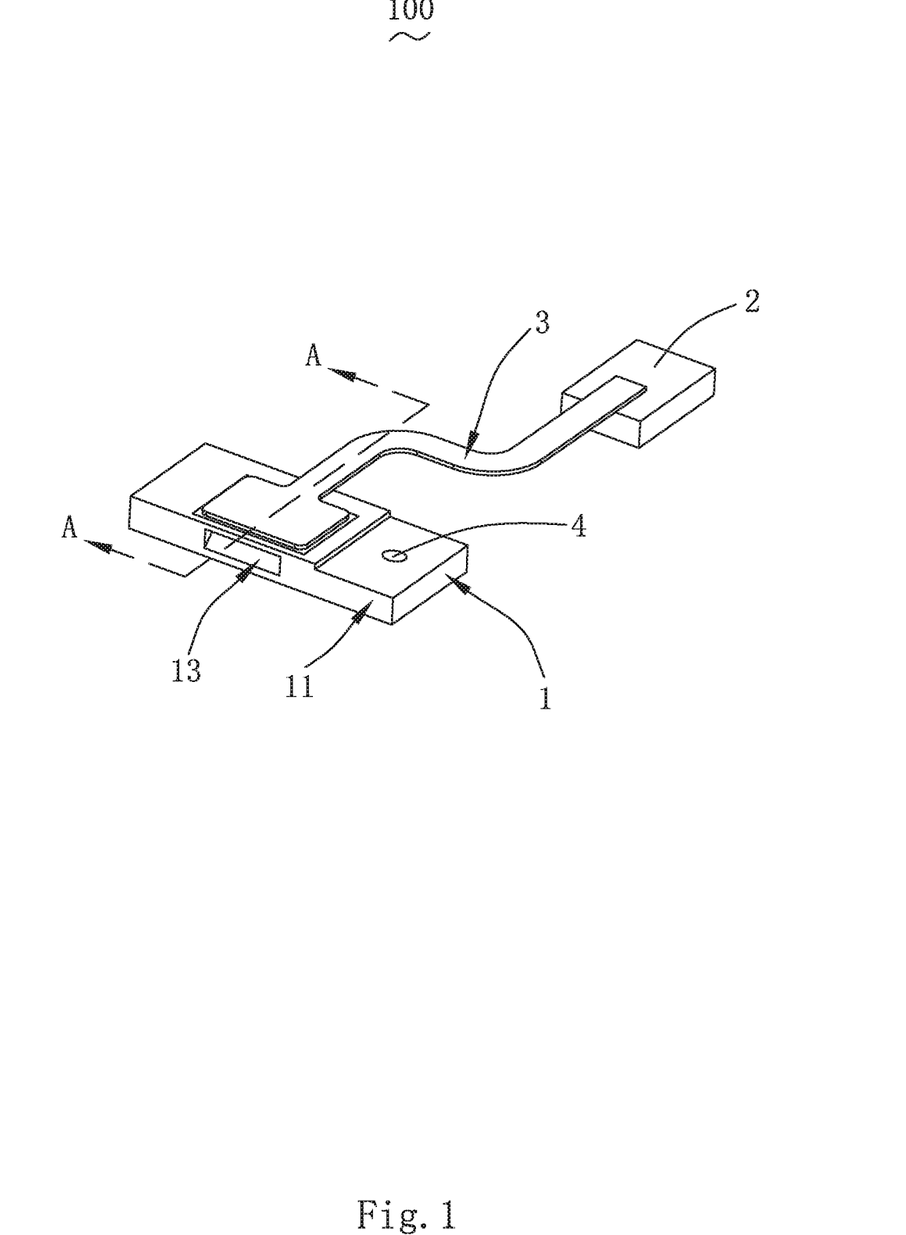
FIG. 1 is an isometric view of a speaker device according to the present invention.
Figure 2:
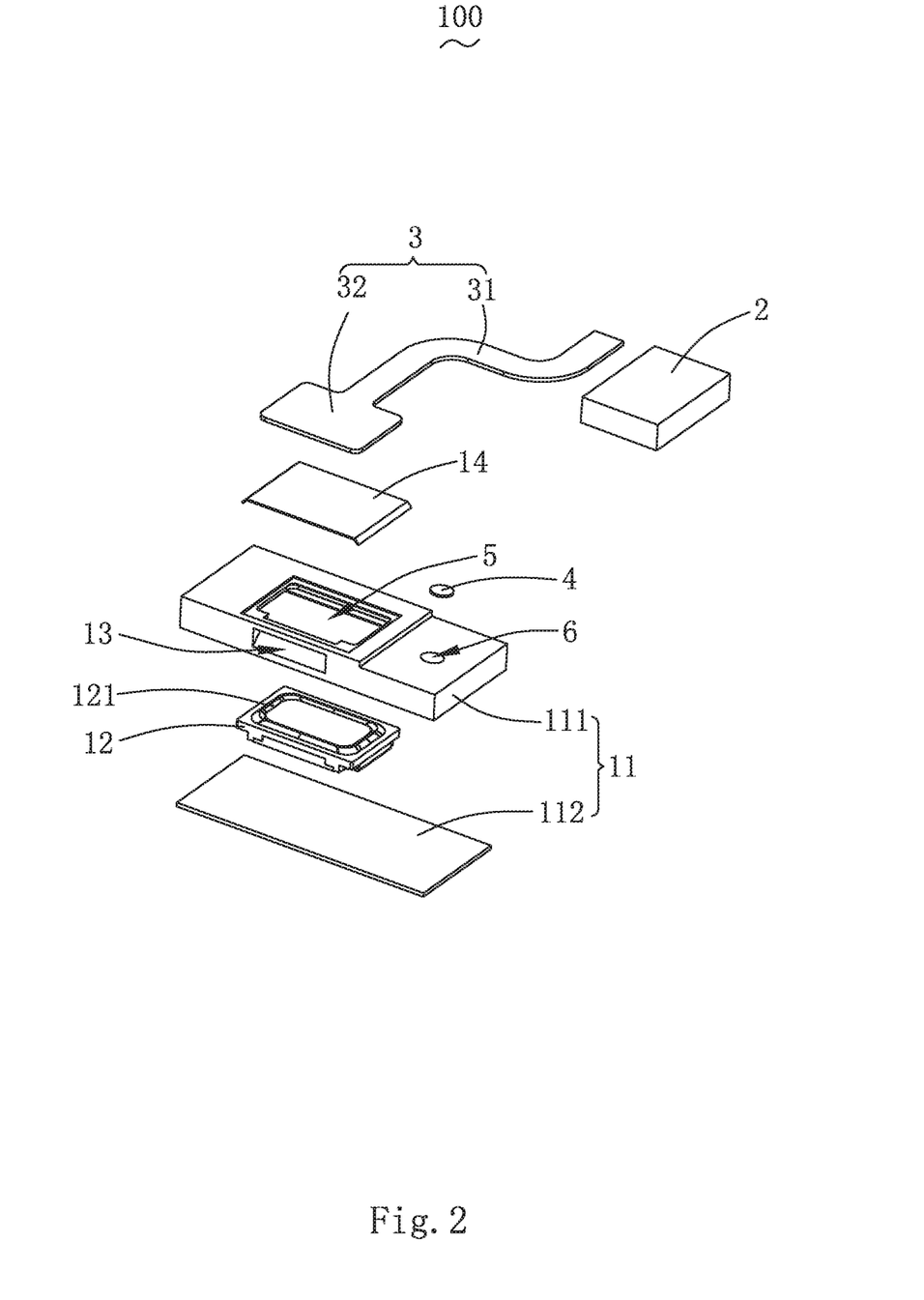
FIG. 2 a part isometric and exploded view of the speaker device according to the present invention.
Figure 3:
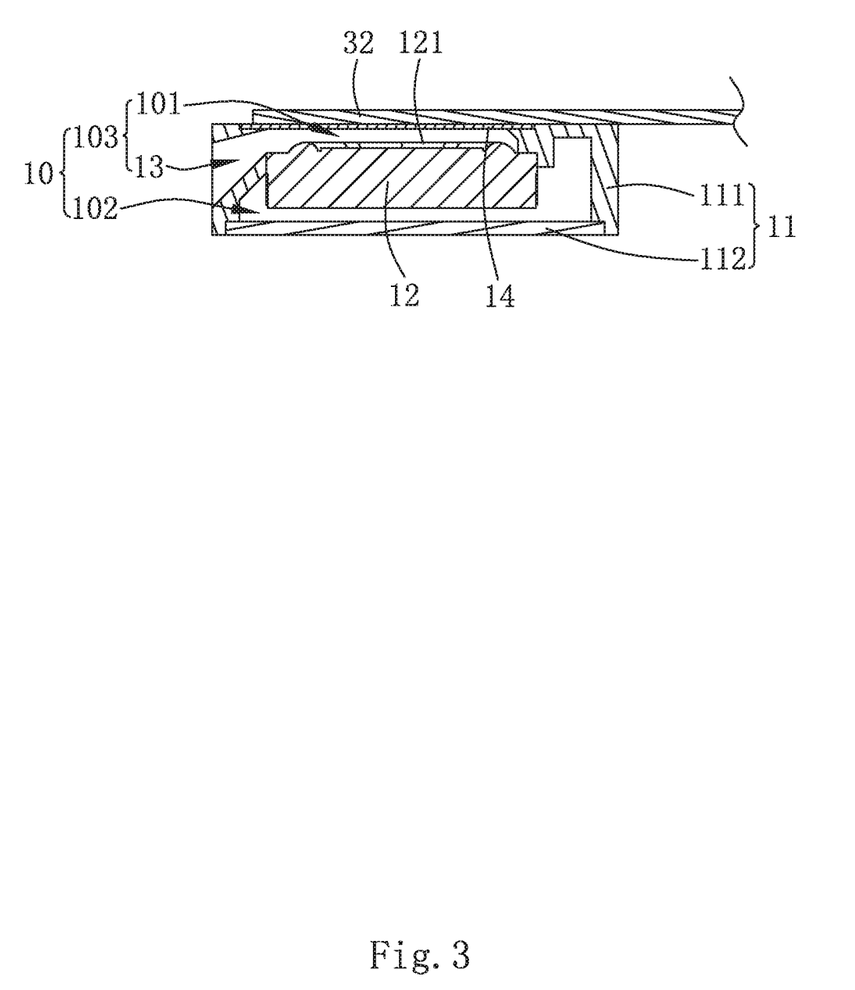
FIG. 3 is a cross-sectional view of the speaker device taken along line A-A of FIG. 1.

Referring to FIG. 1 through FIG. 3, the present invention discloses a speaker device 100. The speaker device 100 includes a speaker box 1 vibrating to produce sound, a heat source 2 spaced from the speaker box 1, a heat conducting member 3 connecting the speaker box 1 with the heat source 2, a valve 4, and a controller 9.

The speaker box 1 includes a housing 11, a speaker 12, a sound-guiding channel 13 and a heat conducting plate 14.

The housing 11 has a first receiving space 10, and the housing 11 is provided with an opening 5 and an adjusting hole 6 penetrating thereof, respectively.

The structural form of the housing 11 is not limited, the housing 11 may be configured integrally, or be configured separately. For example, in this embodiment, the housing 11 is configured separately. The housing 11 includes an upper cover 111 and a lower cover 112 covered on the upper cover 111 to form a first receiving space 10. Both the opening 5 and the adjusting hole 6 penetrate through the upper cover 111 and are spaced apart from each other.

The speaker 12 received in the first receiving space 10 includes a diaphragm 121 for producing sound via vibrating. The first receiving space 10 is divided into a front sounding chamber 101 and a back chamber 102 by the diaphragm 121.

The sound-guiding channel 13 is formed in the housing 11. In this embodiment, the sound-guiding channel 13 is formed in the upper cover 111. The sound-guiding channel 13 communicates the front sounding chamber 101 with the outside and forms a front chamber 103 together with the front sounding chamber 101, wherein the opening 5 communicates with the front chamber 103, and the adjusting hole 6 communicates with the back chamber 102.

The heat conducting plate 14 cover on the opening 5. In this embodiment, the heat conducting plate 14 may be a steel sheet or a copper sheet for conducting heat. Of course, when the Young's modulus of the heat conducting plate 14 is greater than the Young's modulus of the upper cover 111, the high-frequency acoustic performance of the front chamber 103 can be effectively improved.

That is, the front sounding chamber 101 is formed by the diaphragm 121, the upper cover 111, and the heat conducting plate 14. The sound-guiding channel 13 is communicated the front sounding chamber 101 with the outside to form a front chamber 103, thus to form a side sounding structure. The back chamber 102 is formed by the diaphragm 121, the upper cover 111 and the lower cover 112 for improving the low-frequency acoustic performance.

The valve 4 covers on the adjusting hole 6. In this embodiment, the valve 4 is hingely or blidely connected with the housing 11. Specifically, the valve 4 and the upper cover 111 are configured as a hinged or sliding connection. That is, the valve 4 may move relative to the upper cover 111, so that the adjusting hole 6 can be opened or closed.

The heat source 2 generates heat when it operates. In this embodiment, the heat source 2 may be various electronic devices, for example, electronic device installed in an electronic terminal device, such as a processor, a battery, etc., which can generate a large amount of heat during operating. Of course, the electronic devices are not limited to the above.

One end of the heat conducting member 3 is fixed to the heat conducting plate 14 at a side away from the diaphragm 121, and the other end of the heat conducting member 3 is fixed to the heat source 2. The heat generated by the heat source 2 can be transferred to the speaker box 1 via the heat conducting member 13, thus to radiate the heat through the convection of the speaker box 1.

In this embodiment, an orthographic projection of the conducting plate 14 along the vibrating direction of the diaphragm 121 projected on the diaphragm 121 at least partially falls on the diaphragm 121. More preferably, the conducting plate 14 is arranged opposite to the diaphragm 121. With such structure, after the heat is transferred to the front chamber 103 by the heat conducting plate 14, when the diaphragm 121 vibrates, the hot air flow is in a high-speed air flow area, so the air is directly squeezed out through the sound guiding channel 13 at the greatest extent, therefore the heat dissipation efficiency is high.

In this embodiment, the heat conducting member 3 includes a heat conducting body 31 and an expanding portion 32 extending from an end of the heat conducting body 31 close to the speaker box 1. A width of the expanding portion 32 is larger than a width of the heat conducting body 31, and the expanding portion 32 is completely attached to the heat conducting cover plate 14. With such structure, when the heat in the heat source 2 is transferred to the heat conducting plate 14 by the heat conducting member 3, a contact area between the heat conducting member 3 and the heat conducting cover plate 14 is increased, so that the heat transmission efficiency is improved effectively, and the heat dissipation effect is better.

In the above mentioned structure, the heat generated by the heat source 2 is transferred to the heat conducting plate 14 through the heat conducting member 3, and the conducting plate 14 transfers the heat to the front chamber 103. While the diaphragm 121 vibrates to generate sounds, the air in front chamber 103 is pushed to flow to outsides through the sound-guiding channel 13, thereby achieving the convection heat dissipation.

Specifically, when the diaphragm 121 vibrates, a volume of the front chamber 103 changes. When the volume of the front chamber 103 becomes smaller, a part of the hot air in the front chamber 103 is radiated out by the diaphragm 121 via the sound-guiding channel 13. When the volume of the front chamber 103 becomes larger, the outer cold air is drawn in the front chamber 103 by the diaphragm 121 via the sound-guiding channel 13. The convective heat exchange of the hot air in the front chamber 103 and the outer cold air are achieved, that is, the heat dissipation is achieved.

The vibration of the diaphragm 121 may be a vocal form or a silent form, and the heat conducting the front chamber 103 may be radiated out with air circulation through both vibrating forms. Therefore the speaker box 1 can specifically configured for heat dissipation.

Specifically, a lower frequency pulse signal is inputted to the speaker box 1, and a low frequency sound generated by the signal in the speaker box 1 cannot be heard by the human. In the embodiment, the inputted lower frequency input is lower than 1000 Hz. In specific applications, when a music playback task is not performed by the speaker box 1, the pulse signal will be played alone. When the music playback task is performed by the speaker box 1, the pulse signal can also be superposed in the music signal. Since the signal is an ultra-low frequency pulse signal, it cannot be heard by the human, and the normal listening effect will not be affected.

In this embodiment, the structural form of the heat conducting member 3 is not limited, it may be a hollow heat tube. More preferably, a heat conducting medium is filled in the heat tube, and a material of the heat conducting medium may be a heat conducting silicone grease with good heat conductivity, or may be cold liquid. Of course, the heat conducting member 3 may also be a solid integrally-formed structure, in this case, the heat conducting member 3 is made of heat conducting material, such as heat conducting silicon greases with good heat conductivity or metals.

The controller is used for detecting a first temperature of the heat source 2 and a second temperature of the speaker box 1, and a control signal is output after the first temperature and the second temperature are calculated according to a preset rule, thus to control the valve 4 to open or to close.

In this embodiment, the preset rule is as follow.

When both the first temperature and the second temperature are greater than a preset high temperature threshold, for example, if the preset high temperature threshold is 60° C., the controller outputs a first control signal to control the valve 4 to open.

When both the first temperature and the second temperature are less than a preset low temperature threshold, for example, the preset low threshold is 40° C., the controller outputs a second control signal to control the valve 4 to close.

Of course, the preset rule is not limited to the above description, the preset high temperature threshold and the preset low temperature threshold can also be set as desired, and the principles are the same. The controller may be composed of a conventional temperature sensor and a processor. Since the functions that the controller needs to implement are easy to be achieved, those skilled in the art can easily implement them through other components, which is also easy to think of.

It should be noted that when the valve 4 is opened, the speaker box 1 is switched from a closed chamber mode to an open chamber mode. The back chamber 102 of the speaker box communicates with the outside, and the back chamber 102 is equivalent to include a part of the external chamber, which can operate with lower power, thereby reducing the temperature of the speaker box, so the heat conducting member can conduct heat effectively. Therefore the speaker device has a better heat dissipation effect, and its performance is effectively improved. Besides, when the speaker box 1 is switched from the closed chamber mode to the open chamber mode, the sound state does not be change significantly, the acoustic experience under the heat dissipation mode is improved.

Please refer to FIG. 1 through FIG. 6, the present invention further provides a mobile terminal 200, which includes a shell 201, a screen 202 covered on the shell 201 to form a second receiving space 20, and the above-mentioned speaker device 100 received in the second receiving space 20 according to the present invention.

Figure 4:
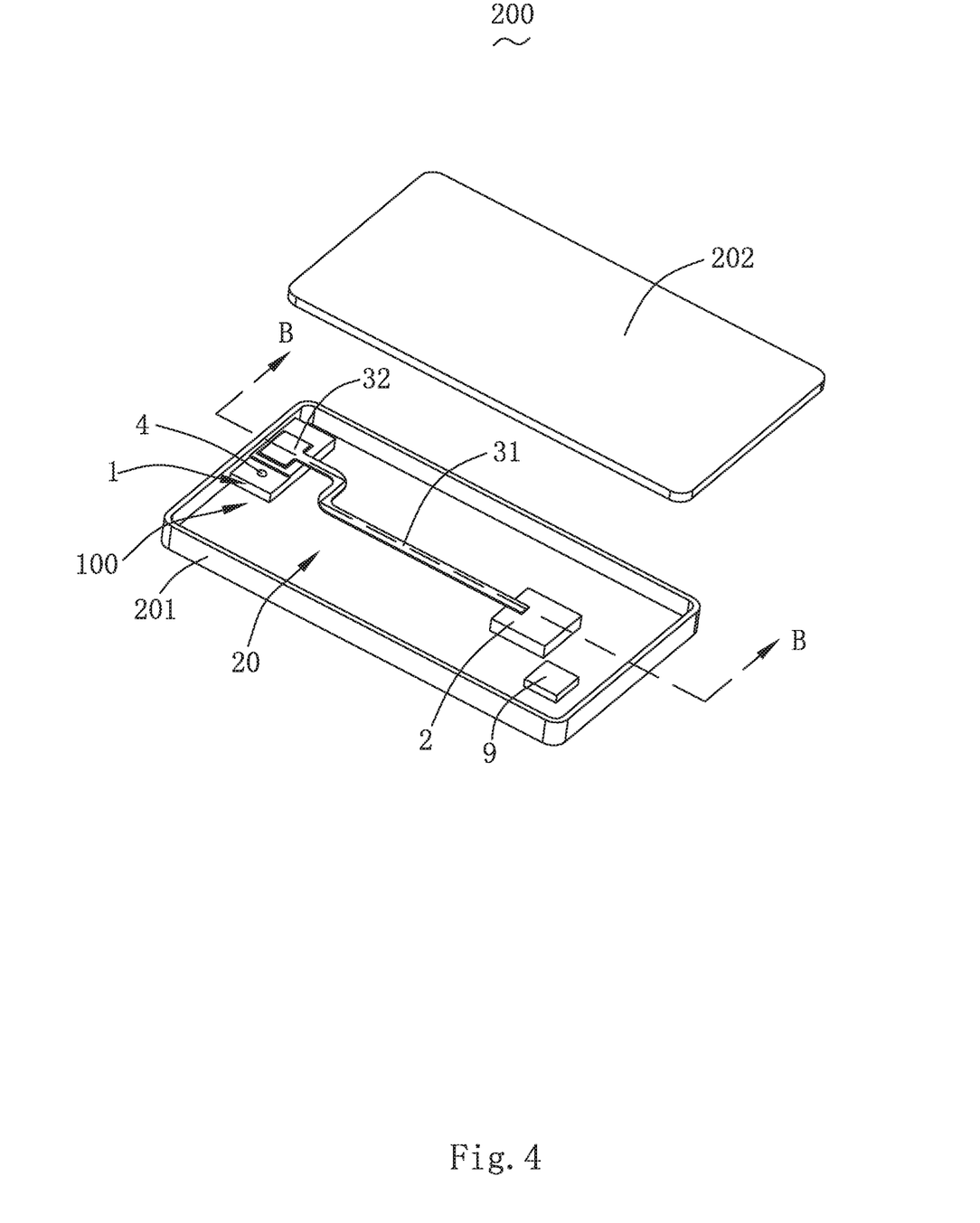
FIG. 4 is an isometric and exploded view of a mobile terminal according to the present invention.
Figure 5:
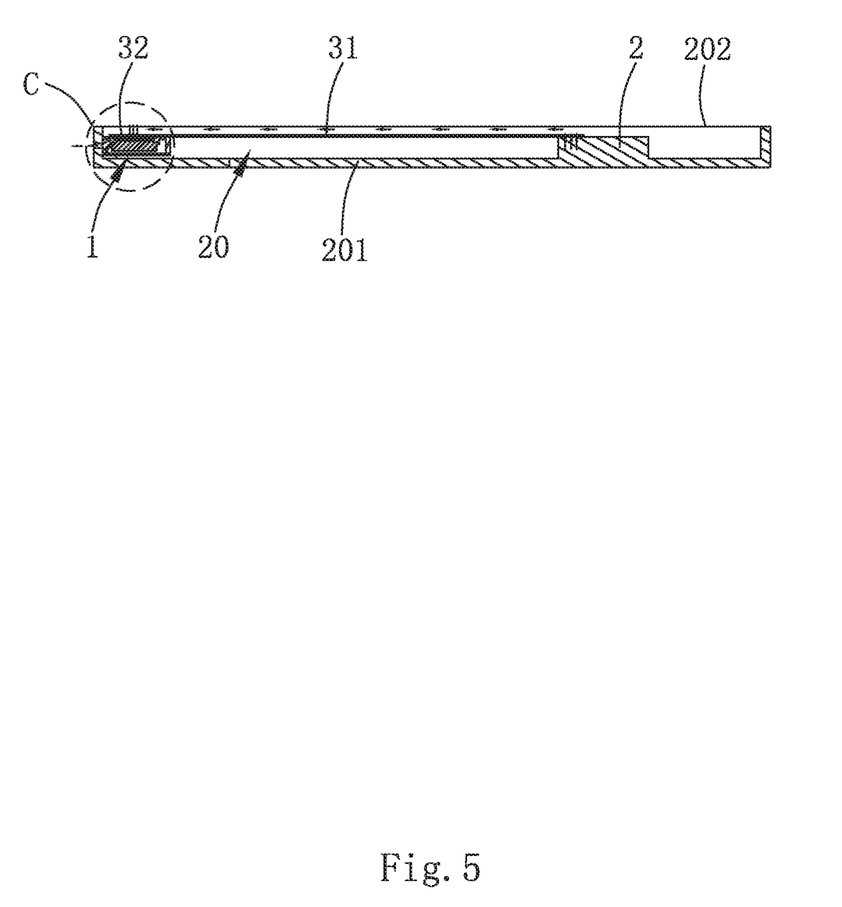
FIG. 5 is a cross-sectional view of the speaker device taken along line B-B of FIG. 4.
Figure 6:
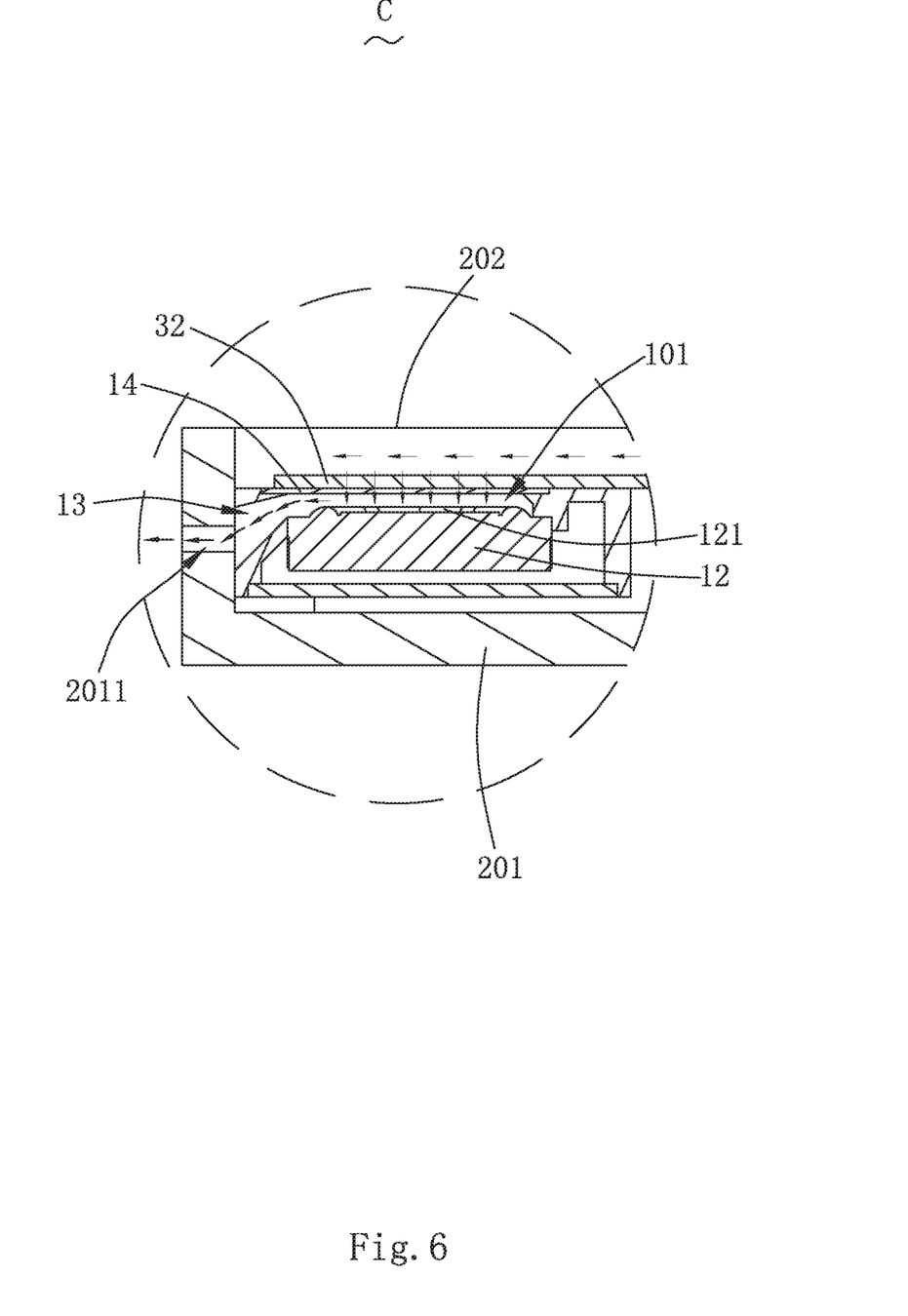
FIG. 6 is an enlarged view of a part of C shown in FIG. 5.

The shell 201 is provided with a sounding opening 2011 penetrating therethrough, and the sounding opening 2011 communicates with the front sound chamber 101 through the sound guiding channel 13, thus to discharge the heat in the front sounding chamber 101 conducted by the heat source 2 through the heat conducting member 3 to the outside of the shell 201, thereby forming a side heat dissipation structure of the mobile terminal 200. The heat source 2 may be an electronic device inside the mobile terminal 200, such as a CPU, a battery, a circuit board and so on.

Compared with the related art, in the present invention, the heat conducting member is disposed between the speaker box and the heat source, one end of the heat conducting member is fixed to the heat conducting plate of the speaker box, and the other end is fixed to the heat source. The speaker box is provided with the adjusting hole penetrating the housing and communicating with the back chamber, the valve covered on the adjusting hole and the controller. The heat is transferred to the heat conducting plate by the heat source through the heat conducting member, and the heat enters in the front sounding chamber. The diaphragm vibrates to push the air in the front sounding chamber to flow to the outside through the sound-guiding channel, thereby achieving the heat dissipation of the heat source. The controller is configured for detecting the first temperature of the heat source and the second temperature of the speaker box, and a control signal is generated after calculating the temperature according a preset rule, so as to control the valve to open or to close. When the valve is open, the speaker box is switched from a closed chamber mode to an open chamber mode. The back chamber of the speaker box is communicated with the outside, and the back chamber is equivalent to include a part of the external chamber, which can be operated with lower power, thereby reducing the temperature of the speaker box, so the heat conducting member can conduct heat effectively. Therefore, the speaker device has a better heat dissipation effect, and its performance is effectively improved. Besides, when the speaker box is switched from the closed chamber mode to the open chamber mode, the sound state does not change significantly, so the acoustic experience under the heat dissipation mode is improved.

The above description is only preferred embodiment of the present invention, and it should be noted that those skilled in the art can also make improvements without departing from the inventive concept of the present invention, but these improvements all belong to the protection scope of the invention.

What is claimed is:

1. A speaker device, comprising a speaker box for generating sound, a heat source spaced apart from the speaker box, and a heat conducting member connecting the speaker box with the heat source; wherein, the speaker box comprises a housing having a first receiving space, a speaker received in the housing, a sound-guiding channel formed in the housing, and a heat conducting plate;

the speaker comprises a diaphragm for producing sound, the first receiving space is divided into a front sounding chamber and a back chamber by the diaphragm, and the sound-guiding channel communicates the front sounding chamber with the outside and forms a front chamber together with the front sounding chamber;

the housing is provided with an opening penetrating therethrough, the opening communicates with the front chamber, and the heat conducting plate covers on the opening, one end of the heat conducting member is fixed to the heat conducting plate at a side away from the diaphragm, the other end of the heat conducting member is fixed to the heat source;

an adjusting hole penetrates through the housing and communicates with the back chamber;

an valve covers on the adjusting hole and a controller, the controller is configured for detecting a first temperature of the heat source and a second temperature of the speaker box; and for outputting a control signal after calculating the first temperature and the second temperature according to a preset rule to control the valve to open or to close.

2. The speaker device according to claim 1, wherein the preset rule is: when both the first temperature and the second temperature are greater than a preset high temperature threshold, the controller outputs a first control signal for controlling the valve to open; when the first temperature and the second temperature are less than a preset low temperature threshold, the controller outputs a second control signal for controlling the valve to close.

3. The speaker device according to claim 1, wherein the valve is hingely connected with or slidely connected with the housing.

4. The speaker device according to claim 1, wherein the housing comprises an upper cover and a lower cover assembled on the upper cover to form the first receiving space, the opening and the adjusting hole are respectively penetrating through the upper cover; the sound-guiding channel is formed in the upper cover, the front sounding chamber is formed by the heat conducting plate, the diaphragm, and the upper cover, and the back chamber is formed by the lower cover, the upper cover, and the diaphragm.

5. The speaker device according to claim 1, wherein an orthographic projection of the heat conducting plate projected on the diaphragm along a vibrating direction of the diaphragm at least partially falls on the diaphragm.

6. The speaker device according to claim 1, wherein the heat conducting member comprises a heat conducting body and an expanding portion extending from an end of the heat conducting body close to the speaker box; a width of the expanding portion is greater than a width of the heat conducting body, and the expanding portion is completely attached to the heat conducting plate.

7. The speaker device according to claim 1, wherein the heat conducting plate is a steel sheet or a copper sheet.

8. The speaker device according to claim 1, wherein the heat conducting member is a hollow heat tube.

9. The speaker device according to claim 1, wherein the heat source is any one of a processor and a battery.

10. A mobile terminal, comprising a shell and a screen covered on the shell to form a second receiving space, and a speaker device received in the second receiving space, the shell is provided with a sounding opening penetrating therethrough, wherein, the speaker device, comprising a speaker box for generating sound, a heat source spaced apart from the speaker box, and a heat conducting member connecting the speaker box with the heat source; wherein, the speaker box comprises a housing having a first receiving space, a speaker received in the housing, a sound-guiding channel formed in the housing, and a heat conducting plate;

the speaker comprises a diaphragm for producing sound, the first receiving space is divided into a front sounding chamber and a back chamber by the diaphragm, and the sound-guiding channel communicates the front sounding chamber with the outside and forms a front chamber together with the front sounding chamber;

the housing is provided with an opening penetrating therethrough, the opening communicates with the front chamber, and the heat conducting plate covers on the opening, one end of the heat conducting member is fixed to the heat conducting plate at a side away from the diaphragm, the other end of the heat conducting member is fixed to the heat source;

an adjusting hole penetrates through the housing and communicates with the back chamber;

a valve covers on the adjusting hole and a controller, the controller is configured for detecting a first temperature of the heat source and a second temperature of the speaker box; andfor outputting a control signal after calculating the first temperature and the second temperature according to a preset rule to control the valve to open or to close;

the sounding opening communicates with the front sounding chamber through the sound-guiding channel, so as to radiate the heat in the front sounding chamber transmitted from the heat source to the outside of the shell.

11. The mobile terminal according to claim 10, wherein the preset rule is: when both the first temperature and the second temperature are greater than a preset high temperature threshold, the controller outputs a first control signal for controlling the valve to open; when the first temperature and the second temperature are less than a preset low temperature threshold, the controller outputs a second control signal for controlling the valve to close.

12. The mobile terminal according to claim 10, wherein the valve is hingely or slidely connected with the housing.

13. The mobile terminal according to claim 10, wherein the housing comprises an upper cover and a lower cover assembled on the upper cover to form the first receiving space, the opening and the adjusting hole are respectively penetrating through the upper cover; the sound-guiding channel is formed in the upper cover, the front sounding chamber is formed by the heat conducting plate, the diaphragm, and the upper cover, and the back chamber is formed by the lower cover, the upper cover, and the diaphragm.

14. The mobile terminal according to claim 10, wherein an orthographic projection of the heat conducting plate projected on the diaphragm along a vibrating direction of the diaphragm at least partially falls on the diaphragm.

15. The mobile terminal according to claim 10, wherein the heat conducting member comprises a heat conducting body and an expanding portion extending from an end of the heat conducting body close to the speaker box; a width of the expanding portion is greater than a width of the heat conducting body, and the expanding portion is completely attached to the heat conducting plate.

16. The mobile terminal according to claim 10, wherein the heat conducting plate is a steel sheet or a copper sheet.

17. The mobile terminal according to claim 10, wherein the heat conducting member is a hollow heat tube.

18. The mobile terminal according to claim 1, wherein the heat source is any one of a processor and a battery.

\* \* \* \* \*